United States Patent [19]

Ranjan et al.

[11] Patent Number: 5,172,090

[45] Date of Patent: Dec. 15, 1992

[54] ELECTRONIC LINE SECTIONALIZER WITH RESETTABLE ACTUATOR

[75] Inventors: Radhakrishna Ranjan, Hickory; Ronald M. Reckard, Taylorsville; Ralph H. Hartley, Hudson, all of N.C.; Tam Nguyen, Summit, Ill.

[73] Assignee: General Electric Company, Hickory, N.C.

[21] Appl. No.: 773,035

[22] Filed: Oct. 8, 1991

[51] Int. Cl.$^5$ ............................................. H01H 71/20
[52] U.S. Cl. ...................................... 337/169; 337/174
[58] Field of Search ............... 337/168, 169, 171, 172, 337/173, 174, 175, 178, 179; 361/115

[56] References Cited

U.S. PATENT DOCUMENTS

| | | | |
|---|---|---|---|
| 3,321,721 | 5/1967 | Smith | 335/32 |
| 4,553,188 | 11/1985 | Aubrey et al. | 361/115 |
| 4,636,764 | 1/1987 | Mee et al. | 337/169 |
| 4,795,996 | 1/1989 | Brown et al. | 337/169 |

Primary Examiner—Harold Broome
Attorney, Agent, or Firm—Henry J. Policinski; William Freedman

[57] ABSTRACT

This sectionalizer comprises a movable current-carrying member carrying a first contact that is engageable with a second contact when the sectionalizer is closed. Overcenter toggle means holds the current-carrying member in its closed position when the toggle means is in an overcenter condition but is ineffective to hold the current-carrying member in said closed position when the toggle means is driven out of its overcenter condition. Electronic control means develops a pulse of electrical energy when predetermined conditions have occurred in the circuit through the sectionalizer. A resettable actuator for said overcenter toggle means comprises operating spring means, permanent magnet means for holding the operating spring means in a charged condition, and electromagnetic means effective when energized by said pulse of electric energy for reducing the holding force provided by the permanent magnet means sufficiently to allow the operating spring means to discharge and drive the overcenter toggle means out of its overcenter condition, thus allowing the current-carrying member to move toward open condition.

11 Claims, 4 Drawing Sheets

ELECTRONIC LINE SECTIONALIZER WITH RESETTABLE ACTUATOR

FIELD OF THE INVENTION

This invention relates to a line sectionalizer and, more particularly, to a line sectionalizer that comprises electronic means for counting interruptions in the circuit through the sectionalizer and actuating means controlled by the electronic means for causing opening of the sectionalizer in the event of a predetermined number of such circuit interruptions occurring in close succession.

BACKGROUND

Electronic line sectionalizers of this type are disclosed in U.S. Pat. No. 4,636,764—Mee et al and 4,553,188—Aubrey et al, both of which are incorporated by reference in the present application. The sectionalizer of the Mee et al patent includes overcenter toggle means which normally holds the sectionalizer in its closed-circuit position and actuating means which responds to a signal from the electronic control means to release the overcenter toggle means and thereby cause the sectionalizer to open. The sectionalizer opens only when the circuit therethrough is in an interrupted state and thus must rely upon stored energy to trigger the actuator into operation.

In the Mee et al patent, the actuating means is a chemical actuator in which a chemcial charge is detonated by a pulse of electrical energy derived by discharging a charged capacitor in the electronic control means. A disadvantage of this type of arrangement is that the chemical actuator is a one-shot device which must be replaced in the field after each such opening operation to permit the sectionalizer, following such opening, to be reset to its closed condition in readiness for continued operation in the same manner as described above.

Replacement of the actuator is a matter of some concern to users, first of all, because of the cost of the replacement actuator and, secondly, because of the need for the line crew to correctly connect the actuator to the electronic circuitry of the sectionalizer for reliable continued operation of the sectionalizer.

One prior approach to avoiding the need for actuator replacement after each actuator-produced opening operator of the sectionalizer is embodied in U.S. Pat. No. 4,795,996—Brown et al, which discloses a sectionalizer that comprises a linkage for holding the sectionalizer closed, which linkage is held in an undercenter position by a first releasable latch. For effecting opening of the sectionalizer, Brown et al provide an actuator that comprises a charged spring and a second releasable latch for holding the spring charged. The second latch is controlled by a solenoid which is operated by a pulse of electrical energy from the electronic control means. Release of the second latch by the solenoid allows the charged spring to apply force to the linkage, which, in turn, releases the first latch, thus causing the sectionalizer to open.

A disadvantage of the Brown et al arrangement is that it is relatively complicated from a mechanical viewpoint since it requires multiple mechanical latches and a solenoid for controlling one of the latches.

The Aubrey et al patent referred to above discloses in FIGS. 4-6 a sectionalizer that is less complicated than the Brown et al arrangement in that it includes no solenoid and has only a single mechanical latch, which holds the undercenter linkage of the sectionalizer in a closed position. But the Aubrey et al sectionalizer employs a chemcial actuator for releasing this latch. This chemcial actuator, like that of the Mee et al patent discussed above, must be replaced after each operation thereof, and thus this sectionalizer is subject to the same disadvantages as discussed in connection with the Mee et al patent.

OBJECTS

An object of our invention is to provide an electronically-controlled line sectionalizer that includes overcenter toggle means for releasably holding the sectionalizer closed and in which opening of the sectionalizer is effected by a simple actuator that (a) can be reliably triggered into a toggle-releasing operation by the electronic control circuit of the sectionalizer and (b) is reusable after such operation, thus eliminating the need to replace the actuator after each actuator-produced opening operation of the sectionalizer.

Another object is to use for the actuator of the sectionalizer a device that comprises an operating spring, a permanent magnet for normally holding the spring in a charged condition, and electromagnetic means operable in response to a signal from the electronic control means of the sectionalizer for reducing the holding force of the permanent magnet sufficiently to allow the operating spring to discharge and release the toggle means of the sectionalizer.

Still another object is to construct this magnetically-controlled actuator in such a manner that electromagnetic means of relatively small size can be used for reducing the permanent-magnet holding force to a low enough level and for a sufficient duration to assure that the permanent magnet does not prevent the operating spring from completing a toggle-releasing operation once the spring has been released.

SUMMARY

In carrying out the invention in one form, we provide a sectionalizer that comprises a movable current-carrying member, a first contact mounted thereon, and a second contact engageable by the first contact when the sectionalizer is in closed position, thereby providing a circuit through the sectionalizer. Mounting means is provided for mounting the current-carrying member so that said current-carrying member is movable between a closed position where said contacts are engaged and an open position where said contacts are separated. The sectionalizer further includes over center toggle means effective to hold the movable current-carrying member in its closed position while the toggle means is in its overcenter condition but in effective to hold the current-carrying member in said closed position while said toggle means is out of said overcenter condition. Control means counts interruptions of the circuit through the sectionalizer and develops a pulse of electric energy when a predetermined number of said interruptions have occurred in rapid succession.

A resettable actuator is provided for the overcenter toggle means which comprises operating spring means, permanent magnet means for holding the operating spring means in a charged condition, and electromagnetic means effective when energized by said pulse of electrical energy for reducing the holding force provided by the permanent magnet means sufficiently to allow the operating spring means to discharge and drive the toggle means out of its overcenter condition, thus allowing the current-carrying member and the first contact to move toward said open position.

BRIEF DESCRIPTION OF FIGURES

For a better understanding of the invention, reference may be had to the following detailed description taken in connection with the accompanying drawings, wherein.

DETAILED DESCRIPTION OF EMBODIMENT

Figure 1:
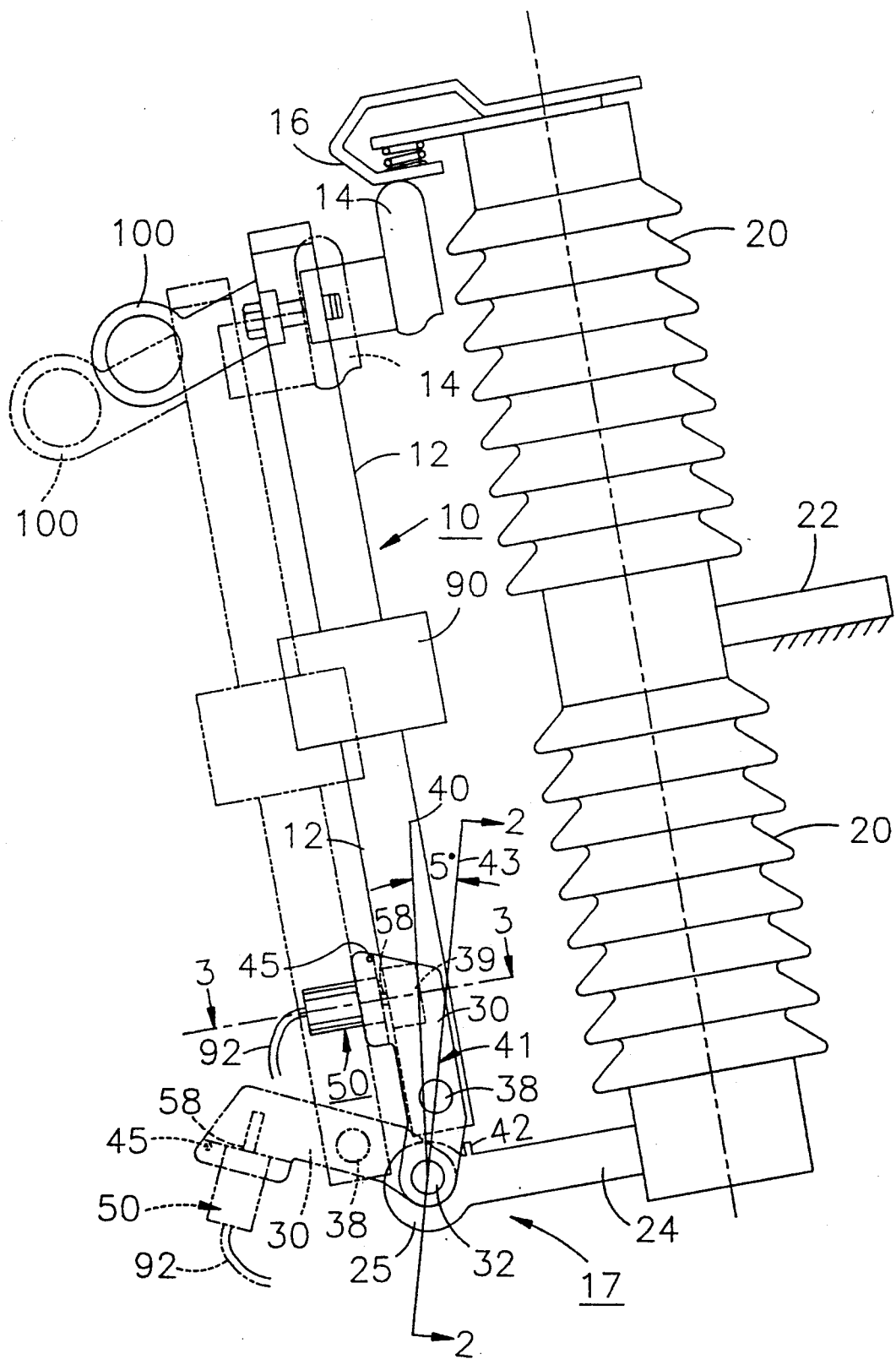
FIG. 1 is a side-elevational view, partly sectional and partly schematic, showing a line sectionalizer embodying one form of our invention.

Referring now to FIG. 1, the line sectionalizer 10 shown therein comprises a tubular current-carrying member 12 carrying near its upper end a first contact 14 that is electrically connected to the current-carrying member. The tubular current-carrying member 12 is electrically connected at its lower end to conductive structure 17 (soon to be described) which provides a lower terminal for the sectionalizer and also a support on which the current-carrying member is pivotally mounted for opening and closing movement. When the sectionalizer is in its solid-line closed position of FIG. 1, the first contact 14 engages a spring-backed stationary second contact 16, thus providing an electric circuit through the sectionalizer that extends in series through the contacts 16, 14, the current-carrying member 12, and the conductive structure 17 at the lower end of the current-carrying member.

Figure 2:
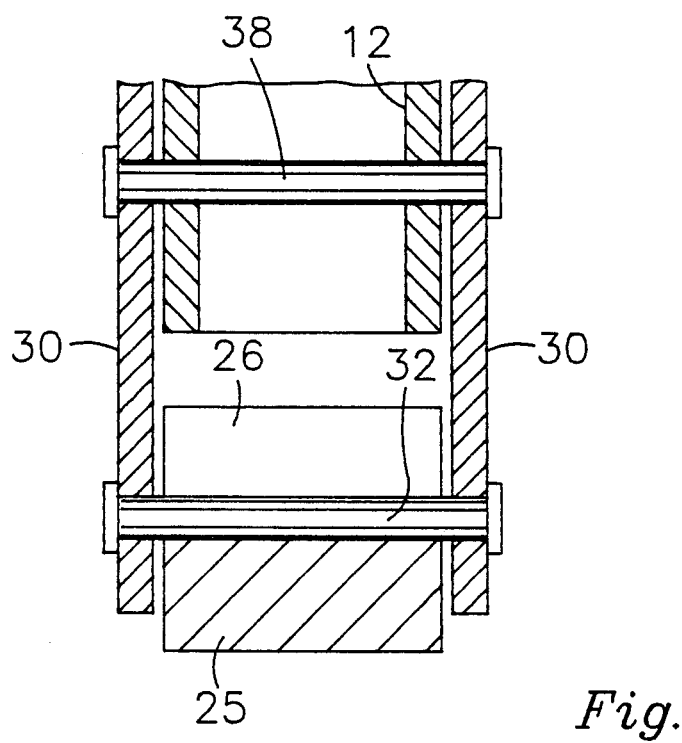
FIG. 2 is a sectional view along the line 2—2 of FIG. 1.
Figure 3:
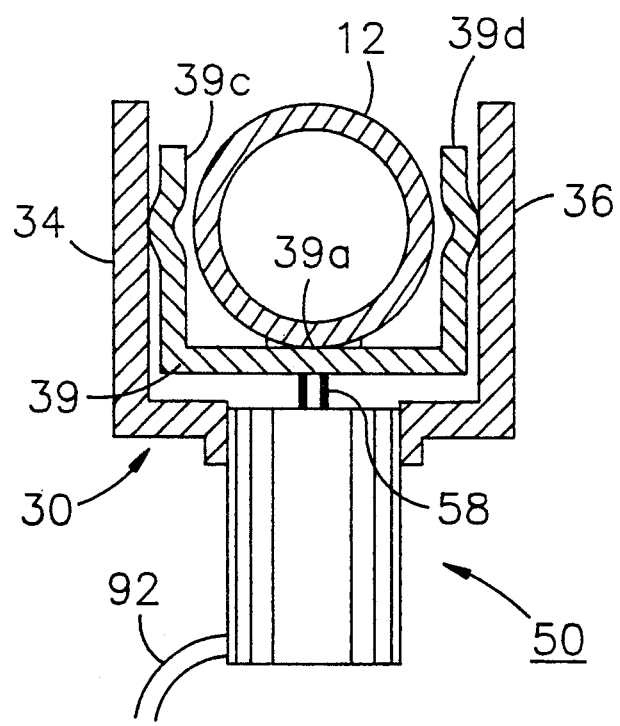
FIG. 3 is a sectional view along the line 3—3 of FIG. 1. The components depicted in FIG. 3 include an actuator 50, which has not been sectioned in FIG. 3.

The stationary contact 16 is mounted atop an insulating column 20, which is carried by a stationary support 22 located near the mid-section of the column. Support 22 is typically fixed to a supporting pole (not shown). At its lower end the insulating column 20 carries a base member 24 that projects laterally therefrom. This base member 24 has a grooved outer end 25 containing an upwardly-opening groove 26 (FIG. 2), and pivotally mounted on this ground outer end 25 is a toggle member 30. The toggle member 30 includes at its lower end a pivot pin 32 rotatably mounted in the groove 26. As seen in FIG. 3, the toggle member 30 has a U-shaped cross-section as viewed along the line 3—3 of FIG. 1. When the sectionalizer is closed, the current-carrying member 12 is located between legs 34 and 36 of the U-shaped toggle member. Fixed to the current-carrying member 12 is a transverse support pin 38 that is pivotally mounted within aligned holes provided in the legs 34 and 36 of the U-shaped toggle member. Support pin 38 is sometimes referred to hereinafter as a toggle pin or a pivot pin.

As seen in FIG. 3, there is a U-shaped spring contact member 39 secured by a suitable joint 39a to the current-carrying member 12 and embracing the current-carrying member. This U-shaped spring contact member 39 electrically interconnects the current-carrying member 12 and the toggle member 30. More specifically, the U-shaped contact member has legs 39c and 39d including protuberances that firmly engage the inner surfaces of the legs 34 and 36 of the toggle member 30 when the sectionalizer is in its closed position. Joint 39a can be of any suitable form, e.g., brazed or rivetted. Spring contact member 39 is preferably of beryllium copper or phosphor-bronze. This contact member is more specifically described in published U.K. patent application GB 2,161,987A, which corresponds to U.S. Pat. No. 4,636,764—Mee et al., referred to hereinabove. This contact member acts not only as current-transfer means for electrically inter-connecting the current-carrying member 12 and the toggle member 30 but also as an anvil that is impacted by the tip of a plunger 58 of the actuator 50 that is operated to initiate an opening operation, as will soon be described.

Figure 5:
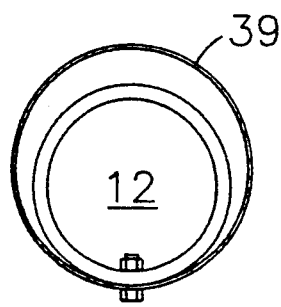
FIG. 5 shows a modified form of current-transfer means for use in the sectionalizer of FIG. 1.
Figure 6:
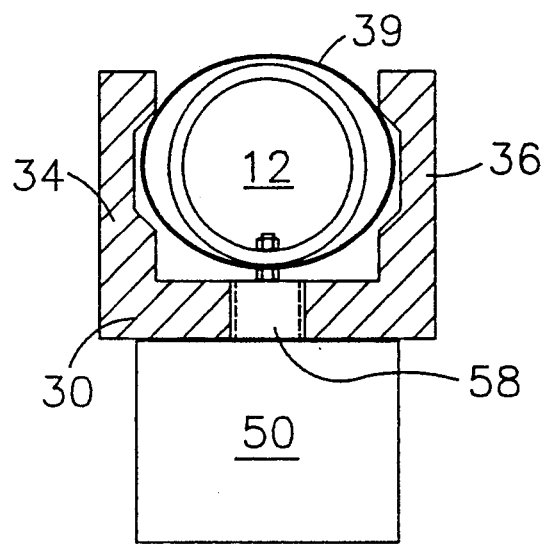
FIG. 6 shows the current-transfer means of FIG. 5 in its assembled position between the toggle member (30) and the current-carrying member 12.

FIGS. 5 and 6 illustrate two modifications of the lower spring contact member (39) that will be described in more detail hereinafter.

When the sectionalizer is closed, as shown in FIG. 1, the center line of toggle pin 38 is disposed in overcenter relationship to a reference line 40, which defines the dead-center position of a toggle mechanism 41 comprising the toggle member 30, the current-carrying member 12, and pivot pins 32 and 38. In one embodiment, when the sectionalizer is in its fully-closed position of FIG. 1, the toggle pin 38 is about 5 degrees overcenter, as represented by the angular relationship between reference line 40 and a line 43 connecting the center lines of pivot pins 32 and 38. When the toggle mechanism 41 is in this overcenter condition, the current-carrying member 12, which is gravity biased to swing in a counterclockwise opening direction about the axes of toggle pin 38 and pivot 32, is held against such counterclockwise swinging motion by the toggle mechanism. In this respect, weight through the center of gravity and the spring back force from upper contact members 14 and 16 urge the toggle member in a clockwise direction relative to the axis of pivot pin 32. But toggle member 30 is blocked from further clockwise motion by a stationary stop schematically shown at 42 in FIG. 1. The current-carrying member is blocked from swinging about pivot 38 by a stop 45 on the toggle member 30 that bears against the current-carrying member when the sectionalizer is in its closed position of FIG. 1. Thus, in FIG. 1, the current-carrying member 12 is blocked from swinging counterclockwise about the axis of toggle pin 38 or pivot pin 32.

Referring still to FIG. 1, opening of the current-carrying member 12 is effected by moving the toggle member 30 counterclockwise about the axis of stationary pivot pin 32 until the axis of toggle pin 38 has moved to the left past the toggle center line 40. When this occurs, the spring force from spring-backed upper contact 16 acting on contact member 14 along with the weight of the current-carrying member 12 act to pivot toggle member 30 counterclockwise instead of clockwise about pivot pin 32. As a result, the toggle member 30 is then pivoted by such forces counterclockwise about pivot pin 32 toward its dotted-line position of FIG. 1 and away from the current-carrying member 12. Such counterclockwise motion of the toggle member 30 allows the current-carrying member 12 under the influence of gravity to fall vertically until contact 14 clears the structure of upper contact 16 and then to swing counterclockwise about toggle pin 38, thus opening the sectionalizer.

For driving the toggle member 30 from its solid-line position of FIG. 1 toward and then through dead-center, thereby unlatching the current-carrying member 12 for opening, we provide an actuator 50. This actuator 50, which is shown in detail in FIG. 4, comprises a cylindrical housing 52 which is fixed to the toggle member 30. Housing 52 comprises at its outer end a cylindrical casing 68 of magnetic material and at its inner end an inner end wall 54 containing a central opening 56. An axially movable plunger 58, preferably of low permeability metal, is guided for axial motion within the central opening 56. This plunger 58 is coupled to a disc-shaped armature 60 of magnetic material which cooperates in a manner soon to be described with an annular disc-shaped permanent magnet 71 and an iron pole piece 62 of cylindrical shape aligned with and fixed to the right hand face of the permanent magnet 62.

Figure 4:
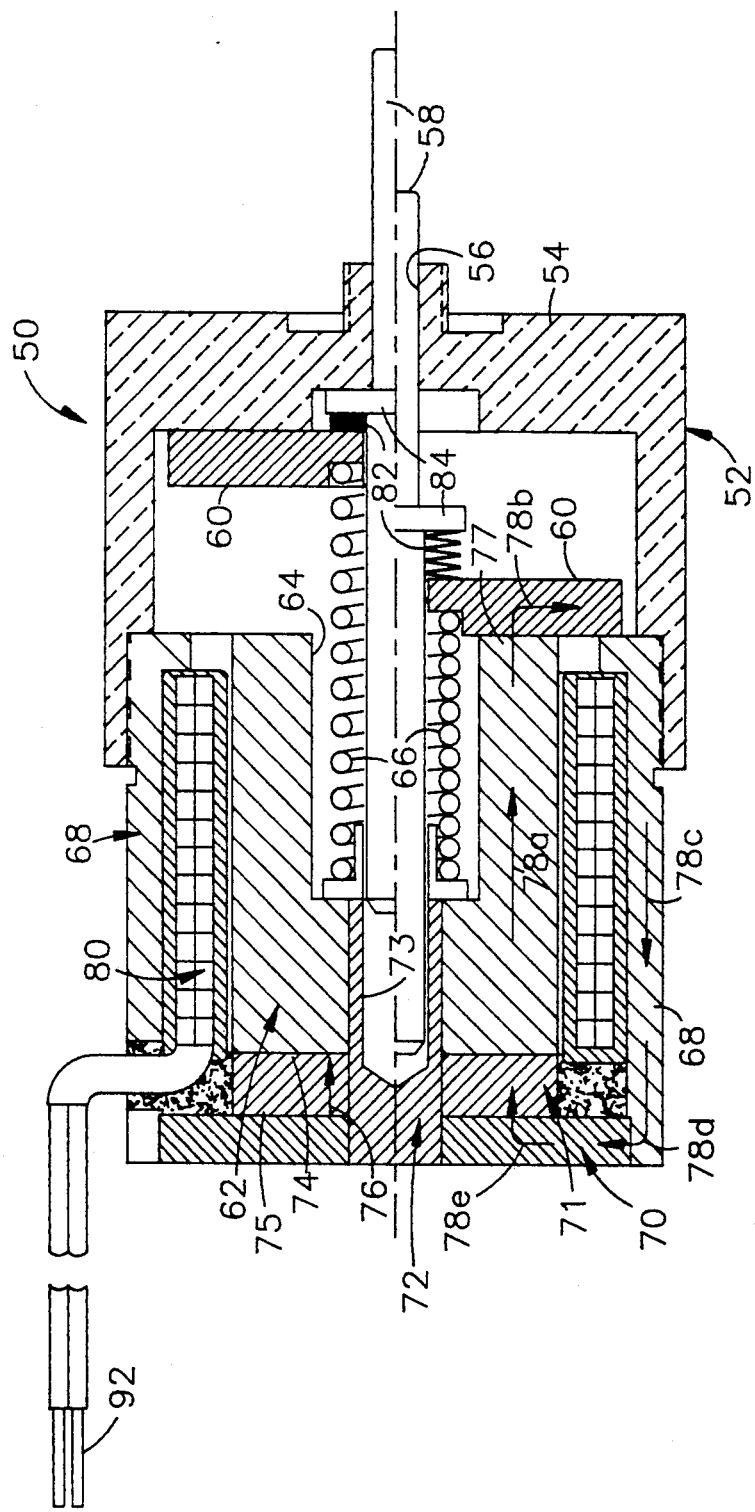
FIG. 4 is a enlarged sectional view of the actuator 50 of FIG. 3. The bottom half of FIG. 4 depicts the actuator in its reset, or initial, condition of FIG. 3; and the top half shows the actuator immediately after it has performed a tripping, or unlatching operation.

Referring to FIG. 4, the cylindrical iron pole piece 62 contains a bore 64 in which is located a compression spring 66 that biases the armature 60 to the right. The plunger 58 is capable of limited axial movement with respect to the armature 60 and extends freely through a centrally-located hole in the armature 60 and through the compression spring 66. There is a shoulder 84 on the plunger 58 forwardly of the armature 60, and an auxiliary spring 82 is disposed between this shoulder 84 and the armature. Preferably, this auxiliary spring 82 is constructed of a series of Belleville washers. Surrounding the cylindrical pole piece 62 in radially-spaced relationship is the cylindrical casing 68 of magnetic material, and this casing includes an outer end wall 70 also of magnetic material that is aligned with and fixed to the left hand face of the permanent magnet 71. The magnetic outer end wall 70 contains a central opening in which is secured a tubular member 72 of non-magnetic material (e.g., stainless steel) having a bore 73 that slidably receives the outer end of the reciprocal plunger 58 and thus acts as a guide for the outer end of the plunger.

The permanent magnet 71 may be thought of as having poles 74 and 75 at its opposite faces and as developing a magnetic field that extends axially through the body of the magnet between those poles as shown by the arrow 76 of FIG. 4. As indicated by additional arrows 78a, 78b, 78c 78d and 78e this magnetic field exits the iron pole piece 62 through a pole face 77 at the right hand end of the pole piece, then enters the magnetic armature 60, extending radially of the armature and exiting near its outer periphery, then returning to the other pole 75 of the magnet via the cylindrical magnetic casing 68, and the magnetic end wall 70.

Referring still to FIG. 4, the magnetic field of the permanent magnet 71 is controlled by an opposing magnetic field developed by an electromagnet that includes a coil 80 surrounding the iron pole piece 62. This coil 80 is located in the annular space between the iron pole piece 62 and the surrounding magnetic casing 68. As will soon be explained, this coil 80 is normally not energized, and the permanent magnet 71 is thus normally free to develop the above-described magnetic field without interference from any opposing field from the coil 80. Accordingly, the armature 60 is then strongly attracted to the pole face 77, where it is held against the bias of the compression spring 66. But when the coil 80 is energized by a pulse of appropriate polarity, it develops a magnetic field which opposes the magnetic field of the permanent magnet, thus reducing the net flux between the pole face 77 and the armature 60 to a level below the minimum capable of holding the armature against the pole face 77. When this occurs, the compressed spring 66 drives the armature to the right away from the pole face 77. This armature motion to the right is transmitted to the plunger 58 via the secondary spring 82 and the shoulder 84 on the plunger, thereby driving the plunger to the right. When the plunger is thus driven to the right, its outer end encounters the contact structure 39 fixed to the current-carrying member 12. When this occurs, a reaction force is transmitted through the plunger to the toggle member 30, thus driving the toggle member 30 from its position of FIG. 1 in a counter-clockwise direction about the axis of its pivot 32. Such motion of the toggle member carries the pivot pin 38 toward and then through dead-center, thereby unlatching the current-carrying member 12 for opening. The toggle member 30 continues moving counter-clockwise into and then through its dotted-line position of FIG. 1, and the then-unlatched current-carrying member 12 follows, first falling vertically to clear contact 14 from the structure of spring 16, then swinging counter-clockwise about pivot 38 into its fully-open position. In a fully-open position of the sectionalizer, both the toggle member 30 and the current carrying member hang almost vertically downward from their pivots, and toggle member 30 rests against a stop (not shown).

A significant feature of our sectionalizer is that when the current-carrying member 12 swings open as described in the immediately-preceding paragraph, it acts to reset the actuator 50. This automatic resetting is produced when the relatively heavy current-carrying member 12, upon swinging open in follow-up relation to the toggle member 30, encounters the then-extended plunger 58, transfering its momentum to the plunger and thereby exerting a resetting force on the plunger. This resetting force drives the plunger into a retracted position, carrying the armature 60 to a retracted position against pole face 77 where it is held by the permanent magnet. The permanent magnet is then capable of holding the armature in this retracted position against the opposing bias of spring 66 because the coil 80 is then no longer energized. As will soon appear more clearly, coil 80 had been energized by a pulse of electrical energy to initiate the above-described opening of the sectionalizer, but this pulse had decayed to substantially zero shortly after unlatching of the sectionalizer.

After the armature 60 has been reset, as described in the immediately-preceding paragraph, the auxiliary spring 82 is free to discharge into its discharged condition of FIG. 4 since the resetting force being applied by the current-carrying member 12 has then dropped to zero.

As pointed out in the introductory portion of this specification, this sectionalizer includes electronic control means for sensing overcurrents and counting interruptions in the circuit through the sectionalizer and for causing operation of the actuator 50 to produce opening of the sectionalizer in the event of a predetermined number of such circuit-interruptions occurring in close succession if the interruptions result from overcurrents through the sectionalizer. In one form of the invention, this electronic control means comprises an electronic control circuit of the form disclosed in published U.K Patent Application GB 2,120,876A, which corresponds to U.S. Pat. No. 4,553,188—Aubrey et al. This control circuit (not shown in the present application) is located within the bore of the tubular current-carrying member 12. Input information is supplied to the control circuit by a current transformer 90 that is mounted about the current-carrying member. This current transformer is suitably encapsulated in weather-proof insulation to provide environmental sealing and reliable power under all weather conditions.

The control circuit also includes a capacitor (not shown) which is charged by energy derived from the power circuit by the current transformer 90. When the control circuit has counted a predetermined number of circuit-interruptions (resulting from overcurrents through the sectionalizer) occurring in close succession, it closes a switch (not shown) that causes the capacitor to discharge through the coil 80. This results in a pulse of electrical energy being supplied from the capacitor to the coil 80, and this pulse causes the actuator 50 to operate as above described to produce opening of the sectionalizer.

A portion of the circuit that supplies the above-described energy pulse to the coil 80 of the actuator is shown in FIGS. 1 and 4 at 92. This circuit portion 92 comprises wires that are connected essentially permanently between the capacitor of the control circuit and the coil 80.

After the sectionalizer has been opened as above described and the actuator 50 has been automatically reset as above described, the sectionalizer is in readiness for a closing operation. Such closing is accomplished by a lineman with the aid of a hook-stick by swinging the toggle member 30 and the current-carrying member 12 clockwise back to their solid-line closed positions of FIG. 1.

As pointed out in the introductory portion of this specification, a typical electronically-controlled sectionalizer of this general type has employed a chemical actuator for releasing the sectionalizer when it is to be opened. A disadvantage of this type of arrangement is that the chemical actuator is a one-shot device requiring field-replacement after each such opening operation in order to prepare the sectionalizer for continued operation in the manner above described when it is returned to its closed position. Replacing the actuator after each opening operation is disadvantageous not only because of the cost of a new actuator but also because of the labor involved in replacing the actuator and further because of the need to correctly rewire the actuator into the electronic circuitry as part of the replacement task.

Our sectionalizer is not subject to these disadvantages because our actuator 50 can be reused after each actuator-produced opening operation without any need for replacement or for being rewired into the electronic circuit. The wires 92 can form a permanent connection between the electronic circuit and the sectionalizer, thus eliminating the danger of a line crew incorrectly or improperly carrying out such rewiring.

One object of our invention is to enable the actuator, during a sectionalizer-opening operation, to perform its toggle-releasing function with an operating spring 66 of relatively small size. While a large operating spring would provide more force for such a toggle-releasing operation, it would also require a larger permanent magnet to hold it compressed in its position of FIG. 4, which, in turn, would require a larger coil (80) or a more powerful electric pulse through the coil to effectively control the permanent magnet, both of which have significant disadvantages. On the other hand, one problem with using a relatively small operating spring is that such a spring has a reduced effectiveness for accelerating the armature after intitial release by the electric pulse, and unless the armature 60 has been moved out of the influence of the permanent magnet 71 before the releasing pulse has terminated, the permanent magnet, upon pulse termination, will pull the armature back to the pole face 77 and thus block the toggle-releasing operation, assuming that the toggle mechanism has not yet passed overcenter.

For overcoming this latter problem, we allow the armature 60 to move a substantial distance away from the pole face 77 before it picks up the plunger 58 and begins applying substantial toggle-releasing force to the toggle member 30. Initial armature motion following release of the armature is used for compressing the relatively light auxiliary spring 82 between the armature and the plunger. When the armature has fully compressed the auxiliary spring 82, the momentum of the armature and the full force of operating spring 66 are applied through auxiliary spring 82 to the plunger 58, thus providing a relatively high force for continuing to drive the plunger while the plunger is moving the toggle member 30 toward dead-center. At the above-described point when the auxiliary spring 82 has been fully compressed, the armature will have substantially cleared the influence of the permanent magnet, thus allowing the operating spring 66 to successfully complete the toggle-releasing operation despite pulse termination.

It is noted that the above acceleration of the armature 60 before the toggle member 30 is picked up to initiate toggle-releasing motion has been accomplished without providing a lost-motion gap between the end of the plunger 58 and the anvil structure 39 of the current-carrying member 12. This is desirable because such lost-motion gap, if present, would interfere with easy resetting of the actuator at the end of an opening stroke, as described above.

FIGS. 5 and 6 show a modified form of the current-transfer means that is used for conducting current between the current-carrying member 12 and the toggle member 30 when the current-carrying member 12 is in its closed position. This modified form also includes a spring contact member (39) between components 30 and 12, but this spring contact member is of a circular configuration in its unstressed condition shown in FIG. 4 (rather than being of U-shaped configuration as with the embodiment of FIG. 3). The circular spring member 39 of FIGS. 6 and 7 surrounds the current-carrying member 12 in eccentric relationship and is secured to the member 12 by a rivet or other suitable connecting means. The closed-curve configuration of this spring contact member is advantageous because such a spring contact member has no ends that can, under certain unusual circumstances, dig into the adjacent surfaces of legs 34 and 36 of the toggle member 30. If this occurs repeatedly the forces opposing the above-described operation of the actuator 50 can become unduly high and interfere with an opening operation of the sectionalizer.

As seen in FIG. 6, when the generally circular spring contact member 30 is seated between the legs 34 and 36, the spring contact member is slightly deformed by its engagement with the legs 34 and 36 at opposite sides of the current-carrying member 12. This deformation produces spring forces which urge the spring contact member into firm engagement with the legs 34 and 36 in the regions of engagement. But there are no ends present on the spring member to produce the above-described digging-in effect.

Figure 7:
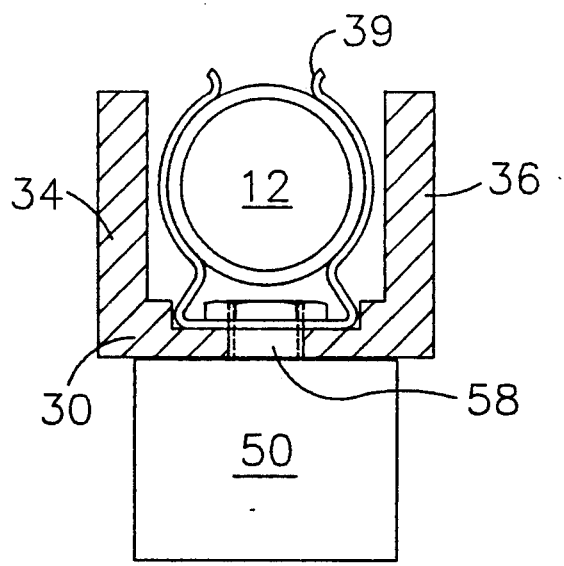
FIG. 7 shows still another modified form of current-transfer means for use in the sectionalizer of FIG. 1.

FIG. 7 shows still another form of current-transfer means usable for this application. In this current-transfer means a U-shaped spring 39 is attached to the toggle member 30 and is shaped like a fuse clip for engagement with the current-carrying member 12. The base of the U-shaped member has a hole in it through which the plunger 58 of the actuator 50 extends to allow the end of the plunger to engage the current-carrying member when opening action is to be initiated by the actuator.

While we have shown and described particular embodiments of our invention, it will be obvious to those skilled in the art that various changes and modifications may be made without departing from our invention in its broader aspects; and we, therefore, intend herein to cover all such changes and modifications as fall within the true spirit and scope of our invention.

What we claim as new and desire to secure by Letters Patent of the United States is:

1. A line sectionalizer comprising:
  (a) a movable current-carrying member,
  (b) a first contact mounted on said movable current-carrying member and electrically connected thereto for engaging a second contact when the sectionalizer is in closed position, thus providing a circuit through said sectionalizer,
  (c) mounting means for mounting said current-carrying member so that said member is movable between a closed position where said contacts are engaged and an open position where said contacts are separated,
  (d) toggle means effective to hold said movable current-carrying member in its closed position while said toggle means is in an overcenter condition but ineffective to hold said current-carrying member in said closed position while said toggle means is out of said overcenter condition,
  (e) electronic control means for counting interruptions of the circuit through said sectionalizer and developing a pulse of electric energy when a predetermined number of said circuit interruptions have occurred in rapid succession,
  (f) a resettable actuator for said toggle means comprising operating spring means, permanent magnet means for holding said operating spring means in a charged condition, electromagnetic means effective when energized by said pulse of electrical energy for reducing the holding force provided by said permanent magnet means sufficiently to allow said operating spring means to discharge and drive said toggle means out of its overcenter condition, thus allowing said current-carrying member and said first contact to move toward said open position.

2. The line sectionalizer of claim 1 in which:
  (a) said toggle means comprises a toggle link coupled to said current-carrying member and occupying an overcenter position relative to said current-carrying member when the toggle means is in said overcenter condition, and
  (b) discharge of said operating spring means drives said toggle link out of its overcenter position, thus allowing said current-carrying member to move toward open position.

3. The line sectionalizer of claim 1 in which:
  (a) said permanent magnet means comprises (i) a permanent magnet and means defining a pole face and (ii) an armature which is attracted to said pole face by said permanent magnet and which is urged away from said pole face by said operating spring means,
  (b) a plunger is disposed between said armature and another portion of said sectionalizer for transmitting toggle-releasing motion from said armature to said toggle means, and
  (c) a lost motion joint is provided between said plunger and said armature that allows said armature to be moved away from said pole face by a predetermined distance before said armature becomes effective to initiate travel of said plunger through toggle-releasing motion that drives said toggle means out of said overcenter condition.

4. The line sectionalizer of claim 3 in which:
  (a) there is provided between said plunger and said armature auxiliary spring means that is compressed by initial motion of said armature away from said pole face while said plunger remains stationary against said other portion of said sectionalizer, and
  (b) further motion of said armature away from said pole face is effective to drive said plunger through toggle-releasing motion by force transmitted through said compressed auxiliary spring means.

5. The line sectionalizer of claim 3 in which said pulse of electric energy is of sufficient strength and duration to allow said operating spring means to drive said armature a sufficient distance from said pole face to prevent the permanent magnet from restoring said armature to the pole face during toggle-releasing motion of said plunger.

6. The line sectionalizer of claim 1 in which said mounting means includes at least a portion of said toggle means, said toggle means portion pivotally mounting said current-carrying member for motion between said open and closed positions.

7. The line sectionalizer of claim 1 in which opening motion of said current-carrying member near the end of its opening travel applies to said actuator a force that resets the actuator into a condition in which said operating spring means is recharged and is held in said recharged condition by said permanent magnet in readiness for a closing operation of said sectionalizer.

8. The line sectionalizer of claim 3 in which opening motion of said current-carrying member near the end of its opening travel applies to said armature through said plunger a force that resets the armature into a retracted position where said permanent magnet means is effective to hold the armature against the bias of said operating spring means.

9. The line sectionalizer of claim 4 in which opening motion of said current-carrying member near the end of its opening travel applies to said armature through said plunger a force that resets the armature into a retracted position where said permanent magnet means is effective to hold the armature against the bias of said operating spring means.

10. The line sectionalizer of claim 9 in which:
  (a) said resetting force also compresses said auxiliary spring means, and (b) said auxiliary spring means discharges after said permanent magnet become effective to hold the armature against said pole face.

11. A line sectionalizer comprising:
(a) a movable current-carrying member,
(b) a first contact mounted on said movable current-carrying member and electrically connected thereto for engaging a second contact when the sectionalizer is in closed position, thus providing a circuit through said sectionalizer,
(c) mounting means for mounting said current-carrying member so that said member is movable between a closed position where said contacts are engaged and an open position where said contacts are seperated,
(d) toggle means effective to hold said movable current-carrying member in its closed position while said toggle means is in an overcenter condition but ineffective to hold said current-carrying member in said closed position while said toggle means is out of said overcenter condition,
(e) control means for counting interruptions of the circuit through said sectionalizer and developing a pulse of energy when a predetermined number of said circuit interruptions have occurred in rapid succession,
(f) an actuator for said toggle means operable in response to said pulse of energy for driving said toggle means out of its overcenter condition, thus allowing said current-carrying member and said first contact to move toward said open position, and
(g) means providing in the circuit through the sectionalizer an electrical connection to said current-carrying member when said sectionalizer is in said closed position comprising a contact spring of closed-curve configuration substantially completely encircling said current-carrying member and electrically and mechanically connected to said current-carrying member, and in which
(h) said toggle means includes a toggle link of U-shaped cross-section having legs disposed at opposite sides of said current-carrying member when the sectionalizer is in said closed position, said contact spring having an outer periphery that slidably engages said legs when said sectionalizer is in and near its closed position, said contact spring being deformed by said engagement with said legs so as to develop force at the regions of engagement for holding said contact spring in firm engagement with said legs.

* * * * *